United States Patent
Ouyang

(10) Patent No.: US 8,289,007 B2
(45) Date of Patent: Oct. 16, 2012

(54) POWER CONVERTERS AND METHODS FOR CONVERTING AN INPUT SIGNAL TO AN OUTPUT VOLTAGE

(75) Inventor: Qian Ouyang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 124 days.

(21) Appl. No.: 12/510,073

(22) Filed: Jul. 27, 2009

(65) Prior Publication Data

US 2010/0026271 A1    Feb. 4, 2010

(30) Foreign Application Priority Data

Aug. 1, 2008    (CN) .......................... 2008 1 0045718

(51) Int. Cl.
*G05F 1/613* (2006.01)
(52) U.S. Cl. ....................................... 323/223; 323/222
(58) Field of Classification Search .................. 323/222, 323/223, 224, 225, 226, 268, 273, 282, 350
See application file for complete search history.

(56) References Cited

U.S. PATENT DOCUMENTS

| | | | |
|---|---|---|---|
| 2003/0205990 A1* | 11/2003 | Wittenbreder, Jr. | 323/222 |
| 2005/0146310 A1* | 7/2005 | Orr | 323/222 |
| 2006/0176038 A1* | 8/2006 | Flatness et al. | 323/282 |

OTHER PUBLICATIONS

Hwu, K.I. and Yau, Y.T., A Novel Voltage-bucking/boosting Converter: KY converter, IEEE, Industrial Technology, 2008. ICIT 2008. IEEE Internaltional Conference, Issue Date: Apr. 21, 2007-Apr. 24,2007 , p. 1.*

* cited by examiner

*Primary Examiner* — Matthew Nguyen
*Assistant Examiner* — Gustavo Rosario Benitez
(74) *Attorney, Agent, or Firm* — Perkins Coie LLP

(57) ABSTRACT

Power converters and associated methods of operation are disclosed herein. In one embodiment, a power converter includes a first switch and a second switch electrically coupled to the first switch in series. The first switch is electrically coupled to a first node and to a second node via the second switch. The power converter further includes a capacitor and a third switch electrically coupled to the first node and to the second node via the capacitor and the second switch. The third switch has a linear-active region of operation.

9 Claims, 5 Drawing Sheets

POWER CONVERTERS AND METHODS FOR CONVERTING AN INPUT SIGNAL TO AN OUTPUT VOLTAGE

CROSS-REFERENCE TO RELATED APPLICATION(S)

This application claims priority to Chinese patent application No. 200810045718.7, filed Aug. 1, 2008, which is hereby incorporated by reference in its entirety.

TECHNICAL FIELD

The present disclosure relates to power converters and associated methods of operation. More particularly, the present disclosure relates to DC-DC converters and associated methods of operation.

BACKGROUND

Converters are commonly used in many of today's electronic equipment for converting a supply voltage to an output voltage. Important performance factors for such converters are output voltage ripples and noises. One conventional technique utilizes a boost circuit in the converters. The boost circuits may have a low voltage ripple and low noise. However, such boost circuits typically have a right-hand zero in their transfer functions in a continuous current mode, and thus resulting in poor performance in transient load response.

Another conventional technique for improving the converter performance is discussed in the thesis named "A Novel Voltage-boosting Converter: KY Converter." FIG. 1 is a schematic diagram showing a topology of the KY converter. As shown in FIG. 1, the KY converter includes an input supply $V_{IN}$, a switch $M_1$ with a body diode $D_1$, a switch $M_2$ with a body diode $D_2$, a diode D, an inductor L, capacitors C and $C_b$, and a load R interconnected with one another.

In operation, when the switch $M_1$ is turned off and the switch $M_2$ is turned on, the input supply $V_{IN}$, the diode D, the capacitor $C_b$, and the switch $M_2$ form a current loop. The input supply $V_{IN}$ provides power to the capacitor $C_b$, causing the voltage across the capacitor $C_b$ to reach $V_{IN}$. Also, the input supply $V_{IN}$, the diode D, the inductor L, the capacitor C, and the load form a current loop as well. The input supply $V_{IN}$ provides power to the load R, as shown in FIG. 2(a). When the switch $M_1$ is turned on and the switch $M_2$ is turned off, the input supply $V_{IN}$, the switch $M_1$, the capacitor $C_b$, the inductor L, the capacitor C, and the load R form a current loop. The input supply $V_{IN}$ and the capacitor $C_b$ provide power to the load R, as shown in FIG. 2(b).

Even though the KY converter can have a low-ripple output voltage, a good noise rejection, and a fast load response, according to the thesis, the KY converter has a few drawbacks. For example, the output voltage $V_O$ is in the range of $V_{IN}$~$2*V_{IN}$, so the KY converter can only function as a step-up, but not a step-down converter. In addition, when switches $M_1$ and $M_2$ are both turned off or inoperative, the input supply $V_{IN}$ still supplies power to the load R through another current loop formed by the input supply $V_{IN}$, the diode D, the inductor L, the capacitor C, and the load R. Thus the input voltage $V_{IN}$ and the output voltage $V_O$ can not be decoupled.

DETAILED DESCRIPTION OF THE INVENTION

Specific details of several embodiments of the disclosure are described below with reference to DC-DC converters and associated methods of operation. Moreover, several other embodiments of the converters may have different configurations, components, or procedures than those described in this section. A person of ordinary skill in the art, therefore, will accordingly understand that the converters and the associated methods of operation may have other embodiments with additional elements, or the invention may have other embodiments without several of the elements shown and described below with reference to FIGS. 3 and 4.

Figure 1:
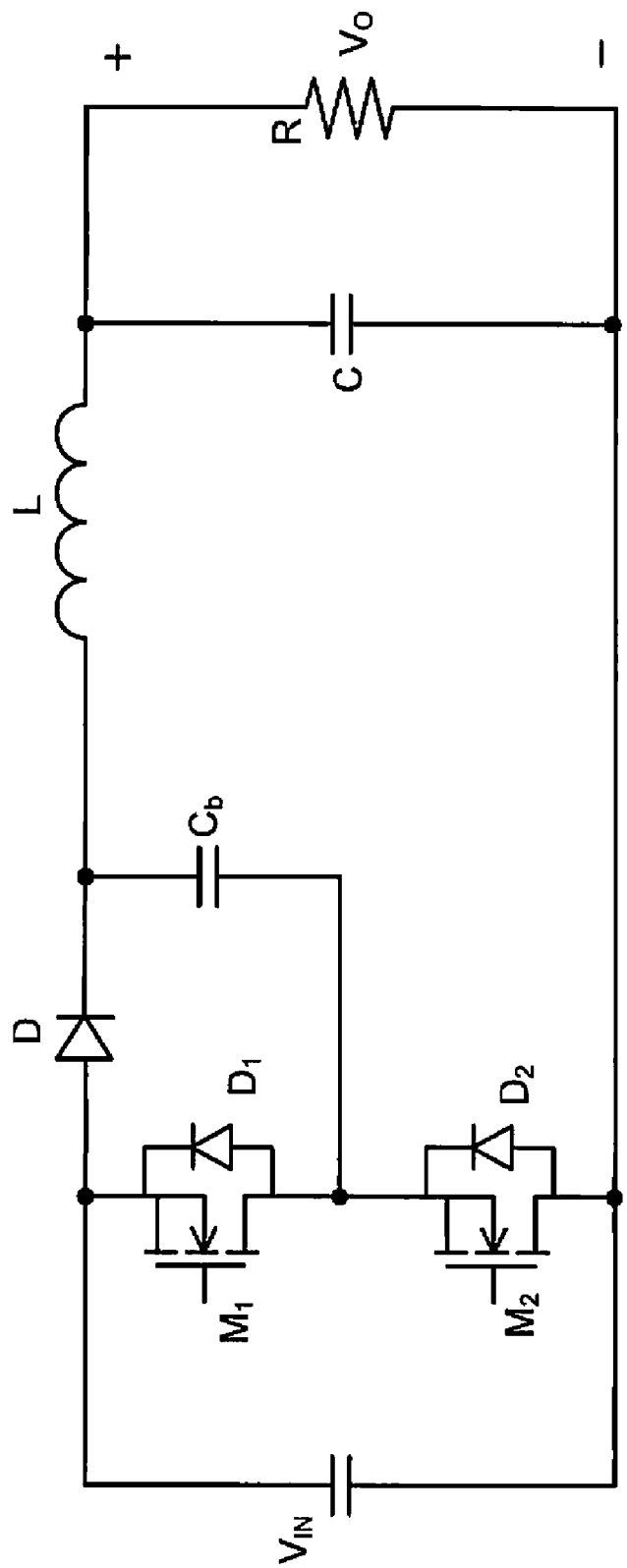
FIG. 1 is a schematic diagram showing a KY converter in accordance with the prior art.
Figure 2A:
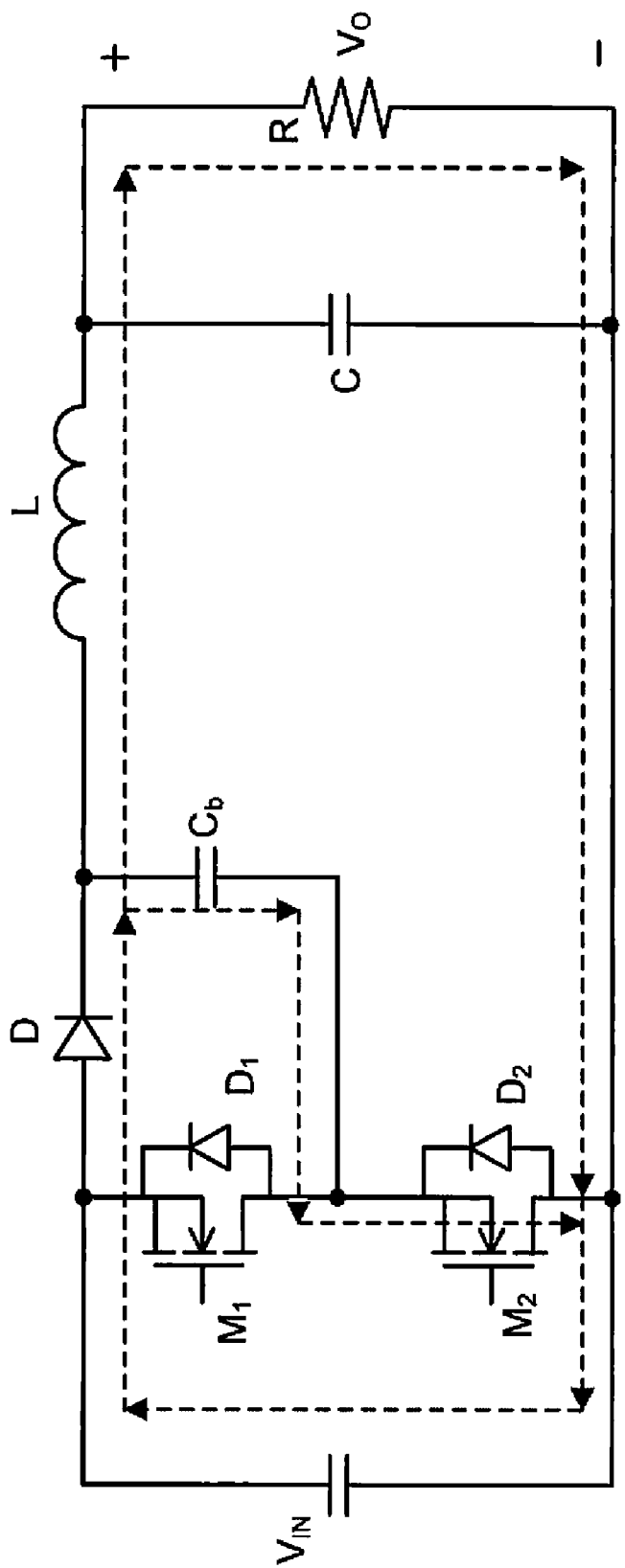
FIG. 2(a) is a schematic diagram showing a current loop in the KY converter of FIG. 1 in one operating mode.
Figure 2B:
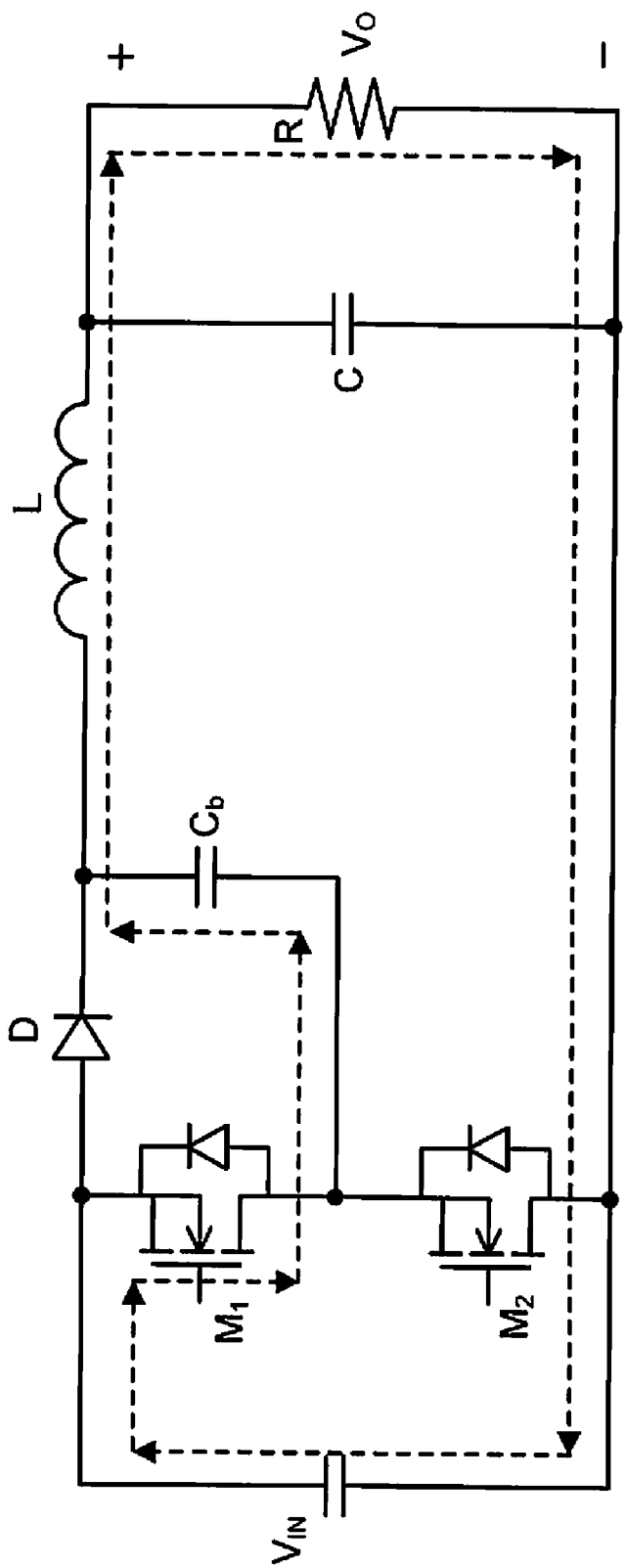
FIG. 2(b) is a schematic diagram showing a current loop in the KY converter of FIG. 1 in another operating mode.
Figure 3:
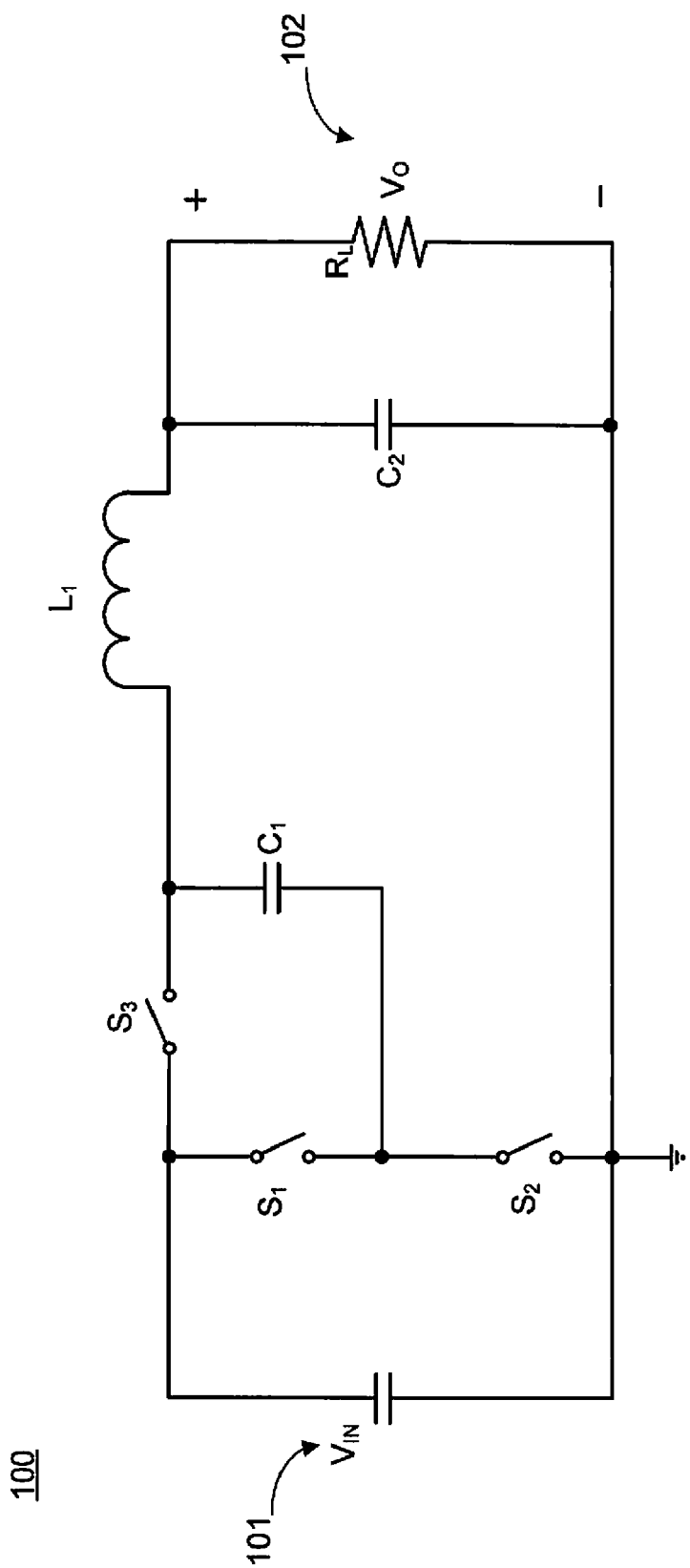
FIG. 3 is a schematic diagram showing a converter in accordance with several embodiments of the disclosure.

FIG. 3 is a schematic diagram showing a converter 100 in accordance with several embodiments of the disclosure. As shown in FIG. 3, the converter 100 includes an input port 101 for receiving an input voltage $V_{IN}$; an output port 102 for providing an output signal $V_O$; a first switch $S_1$ electrically coupled to the input port 101 at one terminal and coupled to ground via a second switch $S_2$ at the other terminal; the second switch $S_2$ electrically coupled between the other terminal of the first switch $S_1$ and ground; a third switch $S_3$ electrically coupled to the input port 101 at one terminal and coupled to the output port 102 via an inductor $L_1$ at the other terminal; the inductor $L_1$ electrically coupled between the other terminal of the third switch $S_3$ and the output port 102; a first capacitor $C_1$ electrically coupled between the first switch $S_1$ and the third switch $S_3$; an output capacitor $C_2$ electrically coupled between the output terminal and ground; and a load $R_L$ coupled in parallel to the output capacitor $C_2$. The third switch $S_3$ can include transistors, MOSFET, IGBT, and/or other controllable devices except a diode.

When the output voltage is required to be between 0~$V_{IN}$, the first switch $S_1$ and the second switch $S_2$ are off or inoperative, and the third switch $S_3$ operates on a linear-active region or a saturated region (i.e., the switch status). The input $V_{IN}$, the third switch $S_3$, the inductor $L_1$, the output capacitor $C_2$, and the load $R_L$ form a current loop. The input $V_{IN}$ provides power to the inductor $L_1$, the output capacitor $C_2$, and the load $R_L$. When the third switch $S_3$ operates in the linear-active region, converter 100 acts as a low-dropout regulator. The output voltage $V_O$ is controlled by adjusting the conduction voltage drop across the third switch $S_3$. When the third switch $S_3$ operates in the saturated region (i.e., the switch status), the output voltage $V_O$ of the converter 100 is close to $V_{IN}$.

When the output voltage is required to be between $V_{IN}$~$2*V_{IN}$, the first switch $S_1$, the second switch $S_2$, and the third switch $S_3$ are all in operation. Further, the second switch $S_2$ and the third switch $S_3$ are turned on or off simultaneously. The first switch $S_1$ and the second switch $S_2$ are turned on complementarily to each another. When the first switch $S_1$ is turned off and the second switch $S_2$ and the third switch $S_3$ are both turned on, the input $V_{IN}$, the third switch $S_3$, the first capacitor $C_1$, and the second switch $S_2$ form a current loop. The input $V_{IN}$ provides power to the first capacitor $C_1$, causing the voltage across the first capacitor $C_1$ to rise toward $V_{IN}$. The input $V_{IN}$, the third switch $S_3$, the inductor $L_1$, the output capacitor $C_2$, and the load $R_L$ also form a current loop. The input $V_{IN}$ provides power to the load $R_L$. When the first switch $S_1$ is turned on and the second switch $S_2$ and the third switch $S_3$ are both turned off, the input $V_{IN}$, the first switch $S_1$, the first capacitor $C_1$, the inductor $L_1$, the output capacitor $C_2$, and the load $R_L$ form a current loop. Both the input $V_{IN}$ and the first capacitor $C_1$ provide power to the load $R_L$. The output voltage $V_O$ is controlled by adjusting the duty cycle of the first switch $S_1$. As a result, the output voltage $V_O$ can range between 0~2*$V_{IN}$. Also, the input port 101 and the output port 102 are coupled when the first switch $S_1$ or the third switch $S_3$ is on, and decoupled when both $S_1$ and $S_3$ are off.

Figure 4:
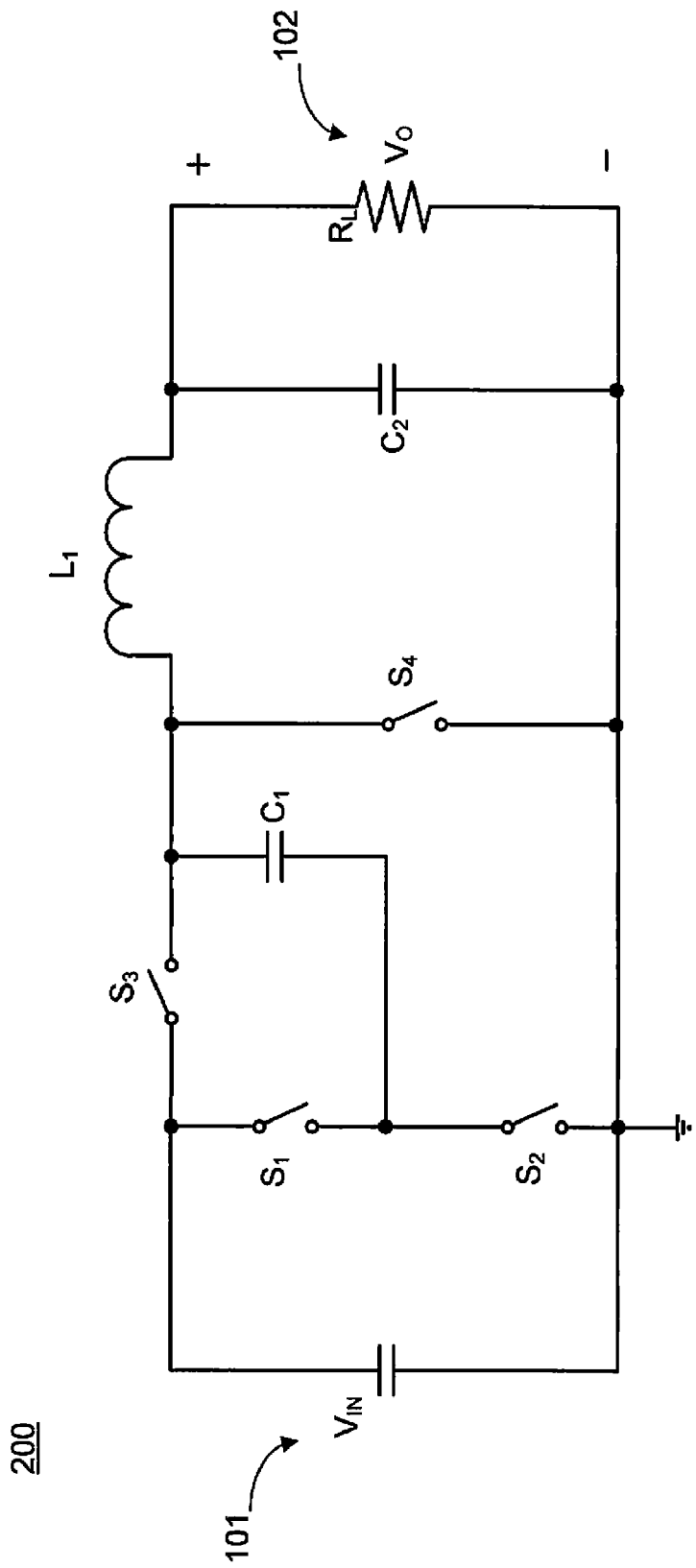
FIG. 4 is a schematic diagram showing a converter in accordance with additional embodiments of the disclosure.

FIG. 4 is a schematic diagram showing a converter 200 in accordance with additional embodiments of the disclosure. Common components and structures are identified by the same reference numbers in FIGS. 3 and 4. As shown in FIG. 4, the converter 200 includes a fourth switch $S_4$ coupled between one terminal of the third switch $S_3$ and ground. The fourth switch $S_4$ can include a diode, a transistor, a MOSFET, an IGBT, and/or other controllable devices.

When the output voltage $V_O$ is required to be between 0~$V_{IN}$, the first switch $S_1$ and the second switch $S_2$ are both off, the third switch $S_3$ and the fourth switch $S_4$ are turned on complementarily to each other. When the third switch $S_3$ is turned on and the fourth switch $S_4$ is turned off, the input $V_{IN}$, the third switch $S_3$, the inductor $L_1$, the output capacitor $C_2$ and the load $R_L$ form a current loop. The input $V_{IN}$ provides power to the inductor $L_1$, the output capacitor $C_2$ and the load $R_L$. When the third switch $S_3$ is turned off and the fourth switch $S_4$ is turned on, the inductor $L_1$, the output capacitor $C_2$, the load $R_L$ and the fourth switch $S_4$ form a current loop. The inductor $L_1$ and the output capacitor $C_2$ provide power to the load $R_L$. The output voltage $V_O$ is controlled by adjusting the duty cycle of the third switch $S_3$.

When the output voltage is required to be between $V_{IN}$~2*$V_{IN}$, the operation of converter 200 can be generally similar to that of the converter 100 of FIG. 3. The first switch $S_1$, the second switch $S_2$, and the third switch $S_3$ can be all in operation. Further, the second switch $S_2$ and the third switch $S_3$ are turned on or off simultaneously; the first switch $S_1$ and the second switch $S_2$ are turned on complementarily to each other; the fourth switch $S_4$ is off. When the first switch $S_1$ is turned off and the second switch $S_2$ and the third switch $S_3$ are both turned on, the input $V_{IN}$, the third switch $S_3$, the inductor $L_1$, the output capacitor $C_2$, and the load $R_L$ form a current loop. The input $V_{IN}$ is supplied to the output capacitor $C_2$ and the load $R_L$. When the first switch $S_1$ is turned on and the second switch $S_2$ and the third switch $S_3$ are both turned off, the input $V_{IN}$, the first switch $S_1$, the first capacitor $C_1$, the inductor $L_1$, the output capacitor $C_2$ and the load $R_L$ form a current loop. The input $V_{IN}$ and the first capacitor $C_1$ provide power to the load $R_L$. The output voltage $V_O$ is controlled by adjusting the duty cycle of the first switch $S_1$.

Several embodiments of the converter 100 and the converter 200 can have improved transient load response performance than conventional converters. When the output voltage is between 0~$V_{IN}$, the load response performance of the converter 100 and the converter 200 are much better than that of a conventional buck converter.

Furthermore, the inductor $L_1$ side of the voltage "V" in the converter 100/200 is from less than $V_{IN}$ (subtract the voltage drop of the third switch $S_3$ from $V_{IN}$) to 2*$V_{IN}$. However, the inductor side of the voltage "V'" in conventional buck converter is from less than $V_{IN}$ (subtract the voltage drop of the corresponding switch from $V_{IN}$) to $V_{IN}$. When the load changes to a heavy load condition from a light load condition, the maximum of the inductor current rise rate of the conventional buck converter is $(V'-V_O)/L_{V}$, where $L_V$ is the inductance of the corresponding inductor. In contrast, the maximum inductor current rise rate in the converter 100/200 is $(V-V_O)/L_{1(V)}$, where $L_{1(V)}$ is the inductance of inductor $L_1$. As described above, the value of V is near twice of that of V'. Hence, when the converter 100/200 has the same inductance as in a conventional buck converter, i.e., $L_V=L_{1(V)}$, $(V-V_O)/L_{1(V)}>(V'-V_O)/L_V$. As a result, the inductor current rise rate of the converter 100/200 is much faster than that of the conventional buck converter to improve the load response.

From the foregoing, it will be appreciated that specific embodiments of the invention have been described herein for purposes of illustration, but that various modifications may be made without deviating from the invention. For example, many of the elements of one embodiment may be combined with other embodiments in addition to or in lieu of the elements of the other embodiments. Accordingly, the invention is not limited except as by the appended claims.

I claim:

1. A power converter, comprising: a first switch having a first terminal and a second terminal, wherein when the first switch is turned on, the first and second terminals are electrically coupled with each other, and when the first switch is turned off, the first and second terminals are riot electrically coupled with each other, and wherein the first terminal is coupled to a first node; a second switch having a first terminal and a second terminal, wherein when the second switch is turned on, the first and second terminals are electrically coupled with each other, and when the first switch is turned off, the first and second terminals are not electrically coupled with each other, and wherein the first terminal of the second switch is coupled to the second terminal of the first switch, and the second terminal of the second switch is coupled to a second node; a capacitor having a first terminal and a second terminal; and a third switch having a first terminal and a second terminal, wherein the first terminal is coupled to the first node, and the second terminal is coupled to the first terminal of the capacitor, the third switch having a linear-active region of operation wherein in a first condition, the first switch and the second switch are turned off, and the third switch is configured to operate in a linear or a saturated region while operating in the first condition; and in a second condition, the second switch and the third switch are turned on and off together; and the first switch and the second switch are turned on and off complementarily while operating in the second condition.

2. The power converter of claim 1, further comprising a fourth switch electrically coupled between the second terminal of the third switch and the second node.

3. The power converter of claim 1, further comprising a fourth switch electrically coupled between the second terminal of the third switch and the second node, wherein the fourth switch includes at least one of a diode, a transistor, a MOSFET, and/or an IGBT.

4. The power converter of claim 1, wherein the first and second nodes are first and second input nodes, and wherein the power converter further includes an inductor electrically coupled to the second terminal of the third switch.

5. The power converter of claim 1, wherein the first and second nodes are first and second input nodes and the capacitor is a first capacitor, and wherein the power converter further includes:
an inductor having a first terminal and a second terminal, wherein the first terminal is electrically coupled to the second terminal of the third switch; and
a second capacitor electrically coupled between the second terminal of the inductor and the second input node.

6. A method for converting an input voltage to an output voltage, comprising: receiving an input voltage at an input port, the input voltage having an input voltage value; in a first condition, achieving a first output voltage between zero and the input voltage value by (i) deactivating a first switch and a second switch and (ii) activating a third switch in a linear-active region or in a saturated region to form a first loop to provide the input voltage to an output port while operating in the first condition; and in a second condition, achieving a second output voltage between the input voltage value and about twice the input voltage value by (i) forming a second loop to provide the input voltage to charge a capacitor and (ii) by forming a third loop to provide the input voltage and storage energy in the capacitor to an output port while operating in the second condition.

7. The method of claim 6, wherein achieving a first output voltage includes forming the first loop with the third switch, an inductor, and an output capacitor.

8. The method of claim 6, wherein achieving a second output voltage includes forming the second loop with the third switch, the capacitor, and the second switch.

9. The method of claim 6, wherein achieving a second output voltage includes forming the third loop with the first switch, the capacitor, and the inductor.

\* \* \* \* \*